United States Patent Office 3,034,999
Patented May 15, 1962

3,034,999
COMPOSITION COMPRISING REACTION PRODUCT OF POLYVINYL ALCOHOL AND PERIODATE OXIDIZED POLYSACCHARIDE AND PROCESS FOR PREPARING SAME
Christopher L. Wilson, Sloatsburg, N.Y., assignor to Miles Laboratories, Inc., Elkhart, Ind., a corporation of Indiana
No Drawing. Filed Aug. 7, 1959, Ser. No. 832,139
13 Claims. (Cl. 260—17.4)

This invention relates to water insoluble films and to a process for their preparation. Particularly the invention relates to water insoluble films which are prepared from polymeric alcohols containing secondary alcohol groups. More particularly the invention relates to films prepared from polymeric alcohols with secondary alcohol groups which have been insolubilized or improved in water resistance by the incorporation therein of minor amounts of periodate oxidized polysaccharides.

The prior art is familiar with films prepared from polymeric alcohols as represented by polyvinyl alcohol. These films, which are easily prepared by simply casting water dispersions of the polymeric alcohols upon the surface to be coated, followed by drying, suffer the disadvantage of being pervious to moisture. Such films after casting become tacky and in some instances are completely dissolved upon continued exposure to water.

In the past there have been a number of proposals for the insolubilization of these polymeric alcohol films with varied degrees of success. For example, such cross-linking agents as dialdehydes, melamine resins, urea-formaldehyde resins and the like have been incorporated into the polymeric alcohol prior to casting. However the use of these materials has not been uniformly successful for reasons of economics or because the resulting films are still not satisfactory from the point of view of water resistance.

It has now been found and forms the object of this invention that improved polymeric alcohol films of a high degree of water resistance may economically be prepared by incorporating into the polymeric alcohols minor amounts of a cross-linking agent which is selected from the group consisting of periodate oxidized polysaccharides.

When materials such as polyvinyl alcohol are treated with periodate oxidized polysaccharides it is postulated that there are formed intramolecular and/or intermolecular acetals which serve to bind together the alcohol polymer making it more resistant to solubilization by water. This interaction may be represented by the following equation.

EQUATION I

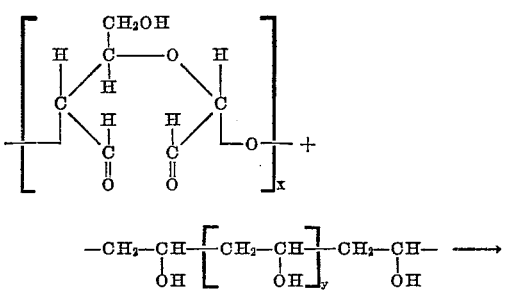

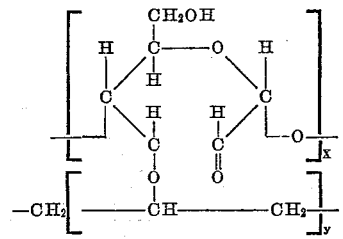

In the formula above $x$ and $y$ may be any whole number and represent the degree of oxidation of the polysaccharide and the degree of polymerization of the polymeric alcohol, respectively.

In the practice of the present invention a 10% aqueous solution of polymeric alcohol represented by a polyvinyl alcohol (Elvanol 72–60—Du Pont) is prepared by slurrying the dry resin into water at room temperature with agitation. After 5 to 10 minutes the slurry is heated to 80 to 90° C. and maintained at that temperature for from 30 to 35 minutes with continual agitation in order to form a complete solution.

A solution of periodate oxidized polysaccharide is prepared by adding the dry material, in portions, to 0.1 N aqueous $Na_2HPO_4$ with stirring. This solution may be of any desired concentration but preferably is a 10 to 30% solution. After solution the material is filtered and the desired amount added to the solution of the polyvinyl alcohol.

If desired, an acid catalyst for the cross-linking reaction such as formic acid or acetic acid may be added to the mixture in amounts varying between about 2 to 15% by weight based on the polyvinyl alcohol present.

The two solutions are stirred together until a homogeneous solution is formed. This solution mixture is then cast to the desired thickness and dried to form a smooth transparent water impervious film.

To more explicitly describe the present invention the following specific example is given.

*Example 1*

Ten parts by weight of polyvinyl alcohol (Elvanol 72–60—Du Pont) was dissolved in 90 parts of water by heating to 85° C. for 40 minutes with continuous agitation. After the solution was completed the material was cast into a film by applying the solution to a glass plate with a roller coater. This film was dried at 27° C. for 18 hours and then stripped from the casting surface. The film thickness was measured as 5 mils.

A strip measuring 40 x 15 mm. was cut from this film and immersed in water at room temperature for 1 hour. The film was then removed and placed on a flat surface. The increase in area of the strip was calculated by measuring the length and width after the water treatment and was found to be 240% greater than the original area.

*Example 2*

Following the procedure described in Example 1 above, 10 parts by weight of the polyvinyl alcohol in solution was intimately contacted by 1 part by weight of a periodate oxidized defatted corn starch in which 90% of the alcohol groups were converted to aldehyde groups by the periodate oxidation. After being subjected to the same conditions described in Example 1 the area increase of this strip was 177%.

Following in general the procedure described above and varying the amounts of the oxidized starch, using the catalysts as shown, Examples 3 through 24 were carried out. The data resulting in these examples are set out in the table below.

TABLE I

| Ex. No. | Pts. by wt. PVA [1] | Pts. by wt. POP [2] | Pts. by wt. Catalyst | Drying Conditions | | Percent Area Increase [3] |
|---|---|---|---|---|---|---|
| | | | | Temp., °C. | Time | |
| 1 | 10 | none | none | 27 | 18 hrs | 240 |
| 2 | 10 | 1 | do | 27 | 18 hrs | 177 |
| 3 | 10 | none | do | 110 | 10 min | 230 |
| 4 | 10 | 1 | do | 110 | 10 min | 161 |
| 5 | 10 | none | 0.5 acetic | 27 | 18 hrs | 227 |
| 6 | 10 | 1 | do | 27 | 18 hrs | 161 |
| 7 | 10 | none | do | 110 | 10 min | 213 |
| 8 | 10 | 1 | do | 110 | 10 min | 161 |
| 9 | 10 | none | 3.0 acetic | 110 | 10 min | 220 |
| 10 | 10 | 2.5 | 2.0 acetic | 110 | 10 min | 147 |
| 11 | 10 | 5.0 | 0.5 acetic | 27 | 18 hrs | 144 |
| 12 | 10 | 2.5 | 1.3 acetic | 27 | 18 hrs | 147 |
| 13 | 10 | 2.5 | do | 110 | 10 min | 147 |
| 14 | 10 | 5.0 | none | 27 | 18 hrs | 152 |
| 15 | 10 | 5.0 | do | 110 | 10 min | 150 |
| 16 | 10 | 2.5 | do | 27 | 18 hrs | 154 |
| 17 | 10 | 2.5 | do | 110 | 10 min | 154 |
| 18 | 10 | 2.5 | 0.4 formic | 110 | 10 min | 155 |
| 19 | 10 | 2.5 | 1.2 formic | 110 | 10 min | 143 |
| 20 | 10 | 2.5 | 0.6 ZnCl₂ | 110 | 10 min | 158 |
| 21 | 10 | 1.0 glyoxal [4] | 0.5 acetic | 27 | 18 hrs | 184 |
| 22 | 10 | do | do | 110 | 10 min | 176 |
| 23 | 10 | do | none | 27 | 18 hrs | 192 |
| 24 | 10 | do | do | 110 | 10 min | 192 |

[1] PVA—Polyvinyl alcohol, 10% aqueous solution.
[2] POP—Periodate oxidized pearl corn starch, 90% oxidized.
[3] After immersion for 1 hr. in water at 27° C.
[4] 25% aqueous solution.

An examination of the data of Table I above indicates the advantage of the incorporation of the periodate oxidized polysaccharides into the polymeric alcohol films. As will be seen from the data above, outstanding water resistance is obtained in films containing from 10 to 15% periodate oxidized polysaccharides. It will also be seen that drying at room temperature (27° C.) for 18 hours or drying for 10 minutes at 110° C. followed by 8 hours at room temperature forms equally suitable films. Highly satisfactory films are obtained in the absence of a catalyst (Examples 2, 14, 15, 16 and 17) or in the presence of a catalyst (Examples 5–13, 18–20).

In all cases completely clear transparent flexible films were obtained. After immersion in water at room temperature for 1 hour the films prepared in accordance with the inventive concept were not tacky and retained a high degree of flexibility and clarity.

Examples 21–24 illustrate the prior art and show that although glyoxal has some insolubilizing effect it is less effective than the materials of the instant invention. This may be seen by comparing Example 21 vs. Example 6, Example 22 vs. Example 8, Example 23 vs. Example 22 and Example 24 vs. Example 4.

The preferred embodiment of this invention is directed to a water impervious film comprising polyvinyl alcohol and periodate oxidized corn starch. It will be appreciated, however, that the inventive concept is not limited to this preferred embodiment but will include other equivalent materials known to those familiar with the art.

Periodate oxidized polysaccharides operable in the inventive concept include such materials as wheat starch, potato starch, cellulose, dextrins, dextrans and related materials. Periodate oxidized polysaccharides having from 25 to 98% of the available hydroxy groups converted to aldehyde groups by the periodate oxidation may be used.

It is preferred to include in the compositions of this invention from 10% to 15% by weight of periodate oxidized polysaccharides although from 5% to 20% may be used, percentage being by weight based on the weight of the total composition.

When a catalyst is used in preparing the water insoluble films of this invention formic acid or acetic acid is preferred. However other acid catalysts such as sulfuric acid, zinc chloride and the like may be used. The catalyst is used in amounts of from 2 to 15% by weight with from 4 to 13% being preferred.

It has been found that the film formation may be accomplished by drying the cast film to the desired water content either at room or elevated temperatures. It is preferred to dry the cast film for a short time at an elevated temperature and then finish drying at room temperature.

To reiterate briefly, this invention relates to new compositions of matter which are water impervious films comprising from 85 to 90% by weight of polymeric alcohol containing secondary alcohol groups and from 10% to 15% by weight based on the weight of the polyvinyl alcohol of a periodate oxidized polysaccharide. If an acetalization catalyst is desired it may be selected from the group consisting of acid catalysts such as formic acid, acetic acid, sulfuric acid and zinc chloride and may be used in amounts between about 2 and 15% by weight based on the weight of the polyvinyl alcohol.

What is claimed is:

1. A composition comprising the reaction product of from about 85% to 90% by weight of polyvinyl alcohol with from about 10% to 15% by weight of a periodate oxidized polysaccharide.

2. A composition according to claim 1 wherein the periodate oxidized polysaccharide is periodate oxidized starch.

3. As a new composition of matter, a water impervious film containing acetal cross-linkages prepared by reacting from about 85% to 90% by weight of polyvinyl alcohol with from about 10% to 15% by weight of a periodate oxidized polysaccharide and thereafter casting the mixture to the desired thickness and drying the cast film for the desired period of time.

4. A composition according to claim 3 wherein the reaction is carried out in the presence of an acid catalyst.

5. A composition according to claim 3 wherein the periodate oxidized polysaccharide is periodate oxidized starch.

6. A process for the preparation of a periodate oxidized polysaccharide-polyvinyl alcohol derivative which comprises reacting from about 85% to 90% by weight of polyvinyl alcohol with from about 10% to 15% by weight of a periodate oxidized polysaccharide in an aqueous medium.

7. A process according to claim 6 wherein the reaction is carried out in the presence of an acid catalyst.

8. A process according to claim 6 wherein the reaction is carried out in the presence of from about 2% to 15% of a catalyst selected from the group consisting of formic acid and acetic acid.

9. A process according to claim 6 wherein the periodate oxidized polysaccharide is periodate oxidized starch.

10. A process for the preparation of a water impervious film which comprises reacting from about 85% to 90% by weight of polyvinyl alcohol with from about 10% to 15% by weight of a periodate oxidized polysaccharide in an aqueous medium, casting the resulting composition to the desired thickness and drying the cast film.

11. A process according to claim 10 wherein the reaction is carried out in the presence of an acid catalyst.

12. A process according to claim 10 wherein the reaction is carried out in the presence of from about 2% to 15% of a catalyst selected from the group consisting of formic acid and acetic acid.

13. A process according to claim 10 wherein the periodate oxidized polysaccharide is periodate oxidized starch.

References Cited in the file of this patent

UNITED STATES PATENTS

| | | |
|---|---|---|
| 2,269,166 | Salo | Jan. 6, 1942 |
| 2,436,433 | Jebens | Feb. 24, 1948 |
| 2,510,257 | Robinson | June 6, 1950 |
| 2,808,380 | Olsen | Oct. 1, 1957 |

OTHER REFERENCES

Kerr: "Chemistry and Industry of Starch," 2nd edition, published by Academic Press Inc., New York, 1950, pages 328–336.